US008727210B2

(12) United States Patent
Clegg et al.

(10) Patent No.: US 8,727,210 B2

(45) **Date of Patent: *May 20, 2014**

(54) TRANSACTION CARD WITH AUDIO FILE PITCH TRANSFORMATION

(75) Inventors: Timothy P. Clegg, Manhatten Beach, CA (US); Primoz Samardzija, Marina del Ray, CA (US)

(73) Assignee: Target Brands, Inc., Minneapolis, MN (US)

( * ) Notice: Subject to any disclaimer, the term of this patent is extended or adjusted under 35 U.S.C. 154(b) by 808 days.

This patent is subject to a terminal disclaimer.

(21) Appl. No.: 12/983,772

(22) Filed: Jan. 3, 2011

(65) Prior Publication Data

US 2011/0106699 A1 May 5, 2011

Related U.S. Application Data

(63) Continuation of application No. 11/843,856, filed on Aug. 23, 2007, now Pat. No. 7,866,550.

(51) Int. Cl.

*G06K 5/00* (2006.01)
*B42D 15/02* (2006.01)
*G06K 19/07* (2006.01)

(52) U.S. Cl.

CPC .......... *B42D 15/022* (2013.01); *G06K 19/0723* (2013.01)
USPC .......................................... 235/380; 235/492

(58) Field of Classification Search

USPC .................. 235/380, 381, 375, 486, 492, 487
See application file for complete search history.

(56) References Cited

U.S. PATENT DOCUMENTS 3,351,268 A 11/1967 Schroeder
4,299,041 A 11/1981 Wilson
4,791,741 A 12/1988 Kondo
D305,887 S 2/1990 Nishimura
5,063,698 A 11/1991 Johnson et al.
5,275,285 A 1/1994 Clegg (Continued)

FOREIGN PATENT DOCUMENTS

GB 2277482 A 11/1994

OTHER PUBLICATIONS

"My Message Card™ from Lands' End," http://www.landsend.com/cgi-bin/GiftCard.cgi?cardType=3&sid=2702142508372193130, printed on May 3, 2007, 4 pages.

(Continued)

*Primary Examiner* — Thien M Le

(74) *Attorney, Agent, or Firm* — Griffiths & Seaton PLLC; JoAnn M. Seaton

(57) ABSTRACT

A transaction card includes an audio circuit, a housing, a switch, and an account identifier. The audio circuit is configured to capture an audio file and to transform a pitch of the audio file. The audio circuit includes a speaker configured to play the captured audio file as transformed by the audio circuit with a different pitch than the pitch originally captured for the audio file. The housing substantially encloses the audio circuit. The switch is movable by a bearer of the transaction card external to the housing. When the bearer interacts with the switch, the audio circuit is activated to transform the pitch of the audio file to the different pitch. The account identifier is fixedly coupled to the housing, and the account identifier links the transaction card to an account or record, wherein the account identifier is machine readable.

21 Claims, 12 Drawing Sheets

(56) References Cited

U.S. PATENT DOCUMENTS

| | | | | |
|---|---|---|---|---|
| 5,359,374 | A | 10/1994 | Schwartz | |
| 5,387,108 | A | 2/1995 | Crowell | |
| 5,539,819 | A | 7/1996 | Sonoyama et al. | |
| 5,577,918 | A | 11/1996 | Crowell | |
| 5,641,164 | A | 6/1997 | Doederlein et al. | |
| 5,765,134 | A | 6/1998 | Kehoe | |
| 5,774,861 | A | 6/1998 | Spector | |
| 5,778,574 | A | 7/1998 | Reuben | |
| 6,019,284 | A | 2/2000 | Freeman et al. | |
| 6,028,752 | A | 2/2000 | Chomette et al. | |
| 6,068,183 | A | 5/2000 | Freeman et al. | |
| D429,733 | S | 8/2000 | Jones et al. | |
| D436,991 | S | 1/2001 | Morgante | |
| 6,356,626 | B1 | 3/2002 | Ohara et al. | |
| 6,402,039 | B1 | 6/2002 | Freeman et al. | |
| 6,607,136 | B1 | 8/2003 | Atsmon et al. | |
| 6,708,892 | B2 | 3/2004 | Smith, II | |
| 6,902,116 | B2 | 6/2005 | Finkelstein | |
| 7,866,550 | B2 * | 1/2011 | Clegg et al. | 235/380 |
| 8,230,624 | B2 * | 7/2012 | Sapp et al. | 40/124.03 |
| 2001/0013270 | A1 | 8/2001 | Kumamoto et al. | |
| 2002/0017759 | A1 | 2/2002 | McClung, III et al. | |
| 2002/0066789 | A1 | 6/2002 | Yen | |
| 2002/0143697 | A1 | 10/2002 | Gotfried | |
| 2002/0169608 | A1 | 11/2002 | Tamir et al. | |
| 2003/0022586 | A1 | 1/2003 | Beged-Dov | |
| 2003/0132300 | A1 | 7/2003 | Dilday et al. | |
| 2003/0155425 | A1 | 8/2003 | Lynch | |
| 2004/0028235 | A1 | 2/2004 | Pan | |
| 2004/0032732 | A1 | 2/2004 | Rubin | |
| 2004/0055188 | A1 | 3/2004 | Dolan-King | |
| 2004/0238625 | A1 | 12/2004 | Walker et al. | |
| 2004/0249748 | A1 | 12/2004 | Schultz et al. | |
| 2005/0090181 | A1 | 4/2005 | Helou | |
| 2005/0236490 | A1 | 10/2005 | Fortune et al. | |
| 2006/0157555 | A1 | 7/2006 | Dean et al. | |
| 2006/0157556 | A1 | 7/2006 | Halbur et al. | |
| 2009/0050693 | A1 * | 2/2009 | Clegg et al. | 235/380 |
| 2009/0265255 | A1 * | 10/2009 | Jackson et al. | 705/27 |
| 2012/0192467 | A1 * | 8/2012 | Qiao et al. | 40/124.03 |
| 2013/0269225 | A1 * | 10/2013 | Nelson | 40/124.03 |

OTHER PUBLICATIONS

"Credit Union tech-talk," http://www.cunews.com/newsletters/2004419.htm, Apr. 19, 2004, 8 pages.

Photograph of "Record Your Own Message Gift Card Package," available at Circuit City stores at least as early as Nov. 1, 2005, 2 pages.

Yada, Yada, Yada voice recorder publicly available for retail sale at least as early as Aug. 2007.

* cited by examiner

TRANSACTION CARD WITH AUDIO FILE PITCH TRANSFORMATION

CROSS-REFERENCE TO RELATED APPLICATIONS

This application is a continuation of and claims priority under 35 U.S.C. §120 to U.S. patent application Ser. No. 11/843,856 filed Aug. 23, 2007, which is incorporated herein by reference.

BACKGROUND OF THE INVENTION

Stored-value cards and other transaction cards come in many forms. A gift card, for example, is a type of stored-value card that includes a pre-loaded or selectively loaded monetary value. In one example, a consumer buys a gift card having a specified value for presentation as a gift to another person. In another example, a consumer is offered a gift card as an incentive to make a purchase. A gift card, like other stored-value cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other transaction cards provide a number of advantages to both the consumer and the retailer.

SUMMARY OF THE INVENTION

One aspect of the present invention relates to a transaction card including an audio circuit, a housing, a switch, and an account identifier. The audio circuit is configured to capture an audio file and to transform a pitch of the audio file. The audio circuit includes a speaker coupled to a remainder of the audio circuit and is configured to play the captured audio file as transformed by the audio circuit with a different pitch than the pitch originally captured for the audio file. The housing substantially encloses the audio circuit. The switch is movable by a bearer of the transaction card external to the housing. When the bearer interacts with the switch, the audio circuit is activated to transform the pitch of the audio file to the different pitch. The account identifier is fixedly coupled to the housing, and the account identifier links the transaction card to an account or record, wherein the account identifier is machine readable. Other related products and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

Figure 1:
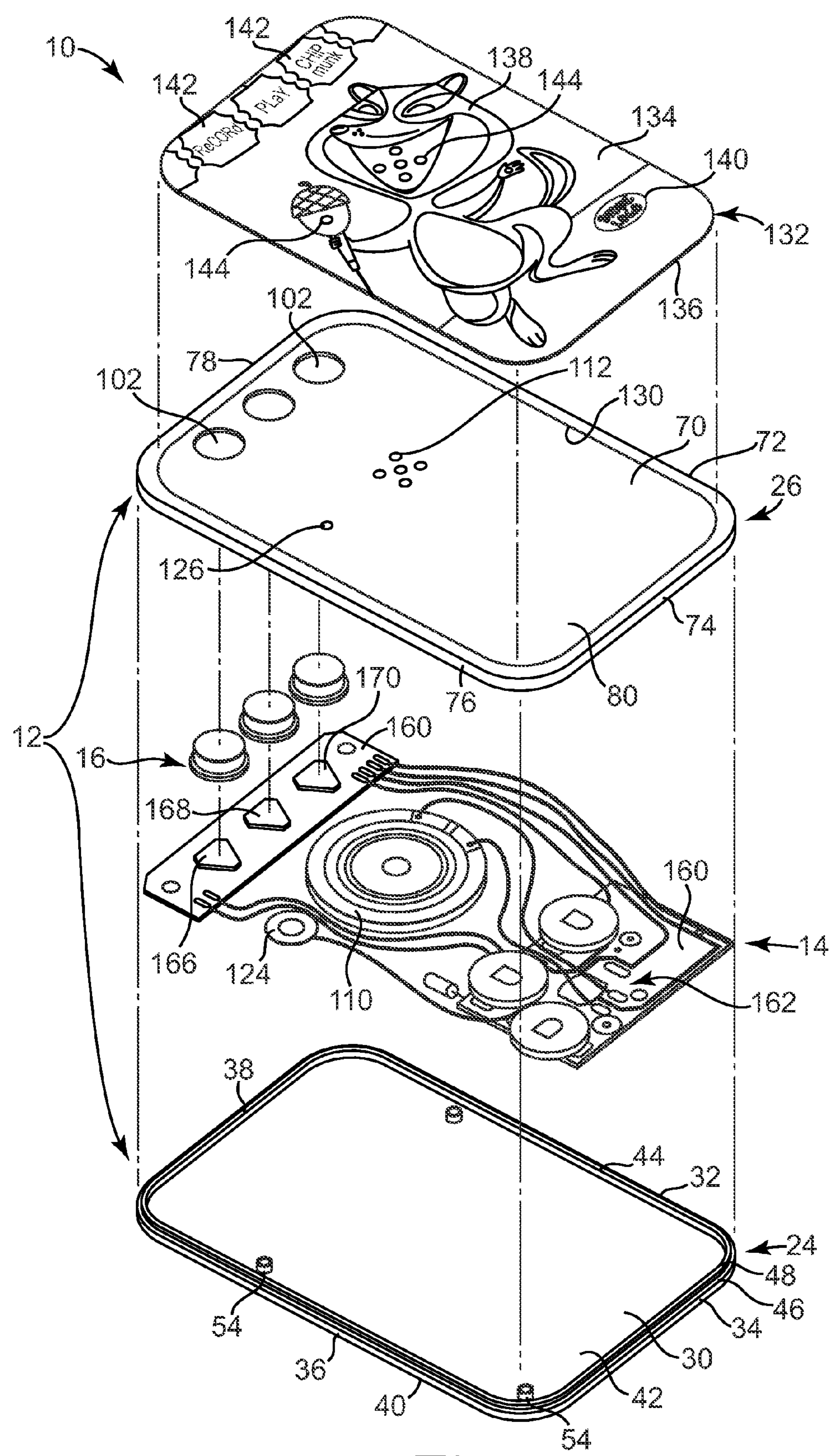
FIG. 1 is an exploded, perspective view illustration of a transaction card, according to one embodiment of the present invention.
Figure 2:
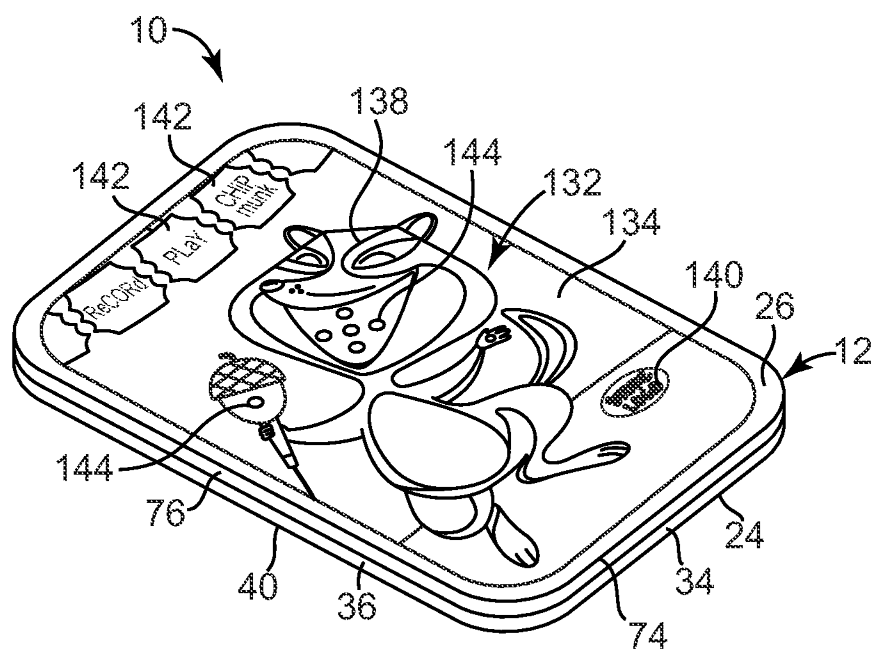
FIG. 2 is a perspective view illustration of the transaction card of FIG. 1, according to one embodiment of the present invention.
Figure 3:
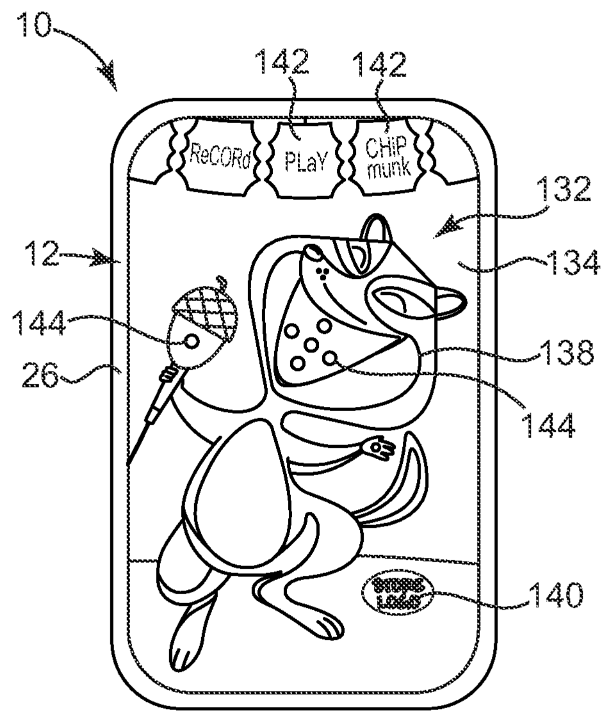
FIG. 3 is a front view illustration of the transaction card of FIG. 1, according to one embodiment of the present invention.
Figure 4:
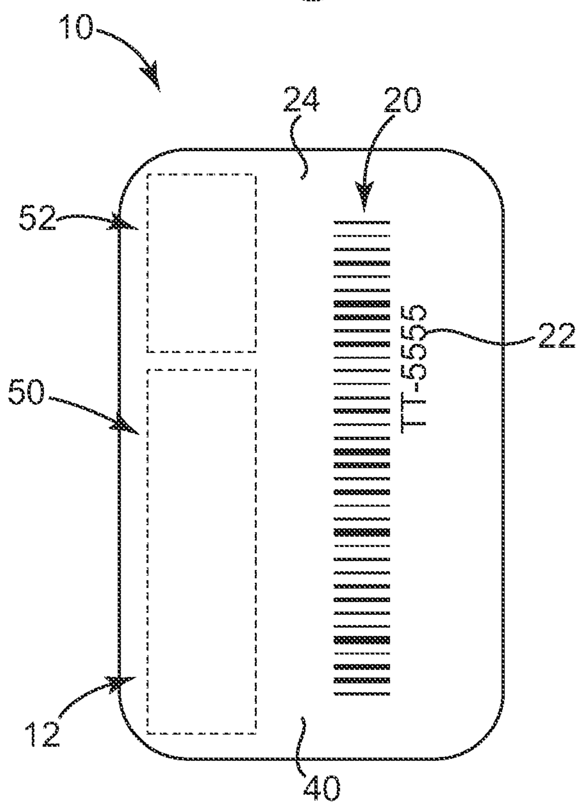
FIG. 4 is a rear view illustration of the transaction card of FIG. 1, according to one embodiment of the present invention.
Figure 5:
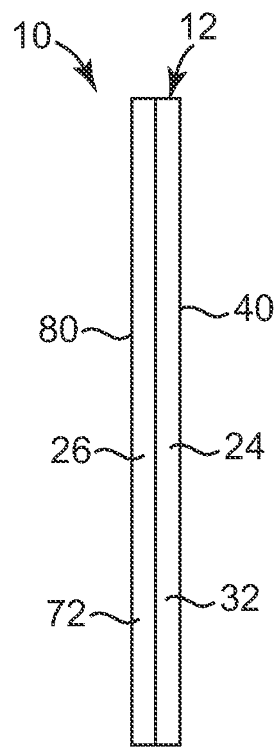
FIG. 5 is a right side view illustration of the transaction card of FIG. 1, according to one embodiment of the present invention, wherein the left side view is a mirror image thereof.
Figure 6:
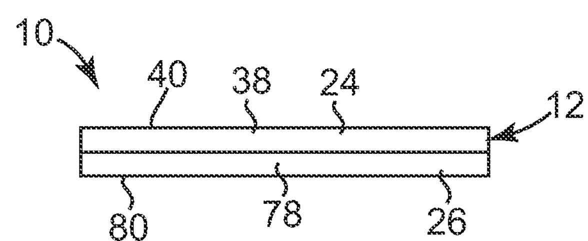
FIG. 6 is a top view illustration of the transaction card of FIG. 1, according to one embodiment of the present invention, wherein the back view is a mirror image thereof.

The following detailed description of the invention is merely exemplary in nature and is not intended to limit the invention or the application and uses of the invention. Furthermore, there is no intention to be bound by any theory presented in the preceding background of the invention or the following detailed description of the invention.

A gift card or other transaction card is adapted for making purchases of goods and/or services from e.g. a retail store or website. According to one embodiment, an original consumer buys the transaction card to give a recipient who in turn is able to use the transaction card at a retail store or setting to pay for goods and/or services. The transaction card, according to embodiments of the present invention, provides the consumer and recipient with extra amusement in addition to the ability to pay for goods and/or services with the transaction card. In particular, the transaction card presents the original consumer and/or other bearer of the transaction card with the ability to hear and, in some instances, record an audio file to the transaction card.

In one example, the transaction card includes a transformative feature, which allows the audio file to be played with one or more of speed, pitch, tone, frequency, reverberation, vibrato, and other audio properties being changed from the audio file as originally recorded to the transaction card. For example, the audio file may be played at a faster speed, with a higher tone, with added reverberation, etc. than the originally recorded audio file. In one example, transformation of the audio file during playback may be used to alter the audio file to more closely imitate a voice or sound associated with an animal, a specific fictional or non-fictional character, generalized type of fictional or non-fictional character, etc. Playing the audio file in a transformed state amuses the bearer of the transaction card as well as any other listeners of the audio file played via the transaction card. In one embodiment, the audio capabilities of the transaction card promote the sale and/or loading of the transaction card by potential consumers and/or bearers of the transaction card.

Turning to the figures, FIGS. 1-6 illustrate one embodiment of a transaction card 10 such as a stored-value product (e.g., gift card, phone card, etc.), credit product, etc. according to the present invention. Transaction card 10 includes an enclosure or housing 12, an audio circuit 14 and buttons 16 and is configured to be used toward the purchase and/or use of goods and/or services. In one embodiment, audio circuit 14 is enclosed within housing 12, and buttons 16 are each at least partially positioned within housing 12 and are configured to interact with audio circuit 14. In particular, upon activation of one of buttons 16 by a bearer of the transaction card 10 (e.g., pressing, switching or other suitable movement of one of buttons 16), audio circuit 14 is activated to play an audio file stored to audio circuit 14. In one example, activation of another one of buttons 16 activates audio circuit 14 to record a new audio file and/or activation of yet another one of buttons 16 causes audio circuit 14 to transform the audio properties of the audio file while the audio file is being played.

Transaction card 10 includes an account identifier 20 (FIG. 4) such as a barcode, magnetic strip, a smart chip or other electronic device, a radio frequency identification (RFID) device or other suitable identifier readily machine readable by a point-of-sale terminal or other account access station or kiosk. Account identifier 20 indicates an account or record to which transaction card 10 is linked. The account or record of the monetary or other balance on transaction card 10 optionally is maintained on a database, other electronic or manual record-keeping system or, in the case of "smart" cards for example, on a chip or other electronics or devices on transaction card 10 itself. Accordingly, by scanning account identifier 20, the account or record linked to transaction card 10 is identified and can subsequently be activated, have amounts debited therefrom and/or have amounts added thereto.

In one embodiment, account identifier 20 includes a character string or code 22 (e.g., a number and or letter string) configured to provide additional security to the use of transaction card 10 and/or configured to be read by a bearer of transaction card 10 to facilitate use of transaction card 10 for web site or other purchases outside of a brick-and-mortar type retail establishment. With the above in mind, account identifier 20 is one example of means for linking transaction card 10 with an account or record, and scanning of account identifier 20 is one example of means for activating or loading value on transaction card 10.

In one embodiment, housing 12 includes a first housing member 24 and a second housing member 26. In one embodiment, first housing member 24 is a base, and second housing member 26 is a cover. In one embodiment of base 24, as described with reference to FIGS. 1 and 4, generally includes a primary panel 30 and side walls 32, 34, 36 and 38. Primary panel 30 is generally planar and defines an outside surface 40 (FIG. 4) and an inside surface 42 opposite outside surface 40. In one embodiment, primary panel 30 is generally rectangular and sized similar to an identification card, a credit card or other card sized to fit in a wallet of a user. In other embodiments, primary panel 30 is otherwise shaped as a square, circle, oval, star or any other suitable shape.

Side walls 32, 34, 36 and 38 each extend from inside surface 42 away from outside surface 40 and collectively extend substantially about the entire perimeter of primary panel 30. In one embodiment, each side wall 32, 34, 36 and 38 extends with a generally perpendicular orientation relative to primary panel 30. In particular, first side wall 32 extends generally parallel to and is positioned opposite third side wall 36. Second side wall 34 and fourth side wall 38 each extend between first side wall 32 and third side wall 36 opposite and generally parallel to one another.

Each side wall 32, 34, 36 and 38 extends from primary panel 30 to collectively define an inside edge 44 opposite primary panel 30. In one example, inside edge 44 is formed as a stepped edge including a first portion 46 and a second portion 48. First portion 46 extends from primary panel 30 a smaller distance than second portion 48 extends from primary panel 30, as illustrated with additional reference to FIG. 1. In one example, first portion 46 extends generally about the perimeter of second portion 48. In this respect, inside edge 44 is formed as a stepped edge with the higher, second portion 48 being positioned just inside lower, first portion 46. In one embodiment, at least first portion 46 forms curved or chamfered corners at the intersection of each side wall 32, 34, 36 and 38 with another of side walls 32, 34, 36 and 38.

In one embodiment, redemption indicia 50 are included on housing 12, for example, on outside surface 40 of base 24. Redemption indicia 50 indicate that transaction card 10 is redeemable for the purchase of goods and/or services and that, upon use, a value of the purchased goods and/or services will be deducted from the financial account or record linked to transaction card 10. In one embodiment, redemption indicia 50 include phrases such as "<NAME OF STORE> GiftCard" and "This GiftCard is redeemable for merchandise or services at any of our stores or at our web site," and/or provides help or phone line information in case of a lost, stolen or damaged stored-value card, etc. In one embodiment, redemption indicia 50 are additionally or alternatively included on cover 26 of housing 12.

In one example, outside surface 40 of base 24 includes directional indicia 52 generally instructing a bearer of transaction card 10 on how to use transaction card 10 to record, play and/or transform an audio file using transaction card 10 as will be further described below. In one embodiment, directional indicia 52 are additionally or alternatively included on cover 26 of housing 12. In one example, directional indicia 52 include instructions for using transaction card similar to the following:

1) Speak directly into the microphone while pressing RECORD for 10 seconds. 2) Release, then press PLAY to hear your fun message. 3) Push PLAY and hold the CHIPMUNK button to get a little squirrelly.

In one embodiment, cylindrical protrusions 54 extend from inside surface 42 of primary panel 30 in a direction substantially parallel to side walls 32, 34, 36 and 38. In one example, each cylindrical protrusion 54 is at least partially hollow so as to receive a corresponding feature of cover 26, as will be further described below, to facilitate alignment and coupling of base 24 with cover 26. Other features configured to facilitate alignment and coupling of base 24 and cover 26 are also contemplated.

Figure 7:
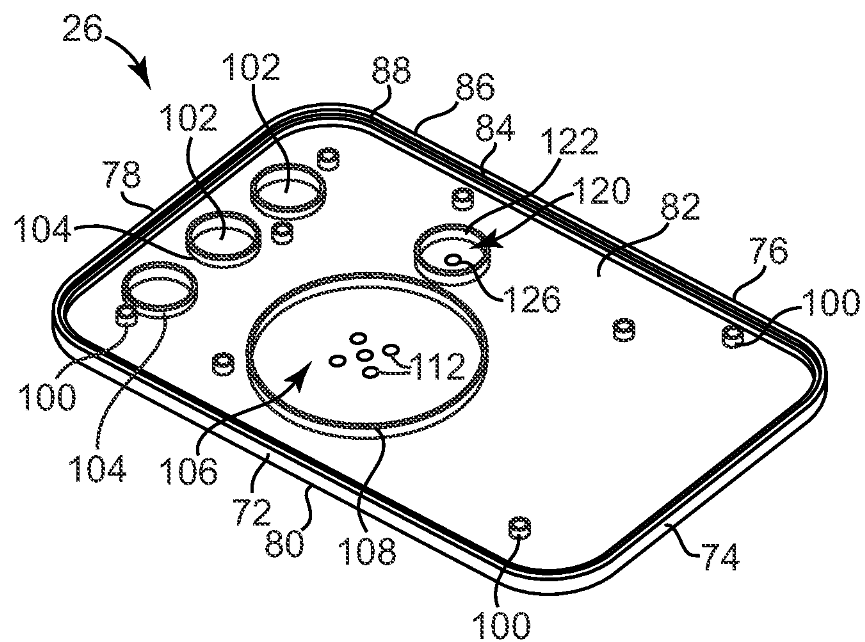
FIG. 7 is a bottom view of a cover of the transaction card of FIG. 1, according to one embodiment of the present invention.

One embodiment of cover 26 is illustrated in FIGS. 1 and 7. Cover 26 generally includes a primary panel 70 and side walls 72, 74, 76 and 78. Primary panel 70 is generally planar and defines an outside surface 80 and an inside surface 82 opposite outside surface 80. In one embodiment, primary panel 70 is generally sized similar to primary panel 30 of base 24. Side walls 72, 74, 76 and 78 each extend from inside surface 82 and collectively extend generally about the entire perimeter of primary panel 70. For example, each side wall 72, 74, 76 and 78 extends with a generally perpendicular orientation relative to primary panel 70. In particular, first side wall 72 is positioned opposite and generally parallel to third side wall 76.

Second side wall 74 and fourth side wall 78 extend between first side wall 72 and third side wall 76 opposite and generally parallel to one another.

Each side wall 72, 74, 76 and 78 extends from primary panel 70 to collectively form an inside edge 84 opposite primary panel 70. In one embodiment, inside edge 84 is a stepped edge including a first portion 86 and a second portion 88. In one embodiment, first portion 86 extends from primary panel 70 a further distance than second portion 88 extends from primary panel 70. First portion 86 extends around the perimeter of second portion 88. In this respect, inside edge 84 is formed as a stepped edge with lower, second portion 88 being positioned just inside higher, first portion 86. In one embodiment, the corners of inside edge 84 formed at the intersections of side walls 72, 74, 76 and 78 with another of side walls 72, 74, 76 and 78 are rounded or chamfered.

Referring to FIG. 7, in one example, cover 26 includes a plurality of protrusions 100 (e.g., cylindrical protrusions, etc.) extending from inside surface 82 parallel to side walls 72, 74, 76 and 78. Some of the plurality of protrusions 100 are positioned on cover 26 to generally align with cylindrical protrusions 54 of base 24 (FIG. 1) upon assembly to facilitate alignment and coupling of base 24 with cover 26. Others of the plurality of protrusions 100 are configured to facilitate alignment and coupling with various components of audio circuit 14 as will be further described below.

In one embodiment, button apertures 102 extend through primary panel 70. Each button aperture 102 is sized and shaped to receive one of buttons 16. In one embodiment, a raised rim 104 extends away from inside surface 82 generally around the perimeter of each button aperture 102. In one example, button apertures 102 and the corresponding raised rims 104 are positioned to correspond with the positioning of audio circuit 14 as will be further described below.

A speaker reception area 106 may be defined by inside surface 82 of cover 26. In particular, in one embodiment, a rim 108 sized similar to or slightly larger than a speaker 110 (FIGS. 1 and 9) of audio circuit 14, which will be further described below, extends from inside surface 82 in a direction generally parallel to side walls 72, 74, 76 and 78. Rim 108 is configured to receive and/or at least partially surround speaker 110 upon assembly in a manner substantially fixing speaker 110 in place relative to cover 26. In one example, a plurality of speaker apertures 112 are defined through primary panel 70 within speaker reception area 106. The plurality of speaker apertures 112 are configured to facilitate transfer of sound from speaker 110 out of housing 12, and therefore, out of transaction card 10, during use. Although described above as being included in cover 26, in one embodiment, one or more of speaker reception area 106, rim 108 and the plurality of speaker apertures 112 are defined at least in part by base 24.

A microphone reception area 120 may be defined by insides surface 82 of cover 26. In particular, in one embodiment, a rim 122 sized similar to or slightly larger than a microphone 124 (FIGS. 1 and 9) of audio circuit 14, which will be further described below, extends from inside surface 82 in a direction generally parallel to side walls 72, 74, 76 and 78. Rim 122 is configured to receive and/or at least partially surround microphone 124 upon assembly in a manner substantially fixing microphone 124 in place relative to cover 26. In one example, at least one microphone aperture 126 is defined through primary panel 70 within microphone reception area 120. The at least one microphone aperture 126 is configured to facilitate transfer of sound from outside of housing 12 to microphone 124, which is maintained within housing 12 during use. Although described above as being included in cover 26, in one embodiment, one or more of microphone reception area 120, rim 122 and at least one microphone aperture 126 are defined at least partially by base 24.

In view of the above, outside surface 80 at least partially defines button apertures 102, the plurality of speaker apertures 112 and at least one microphone aperture 126. In addition, in one embodiment, a panel indentation 130 (FIG. 1) is defined on outside surface 80 of cover 26 and is sized and configured to receive a face panel 132 (FIG. 1) as will be further described below.

In one embodiment, each of base 24 and cover 26 is formed by injection molding of plastic (e.g. polycarbonate, polystyrene, polyvinyl chloride (PVC), acrylonitrile butadiene styrene (ABS), polyethylene terephthalate (PET), teslin, polyactide (PLA) and acrylic) or other suitable material to define the various attributes of base 24 and cover 26. Other methods of forming base 24 and cover 26 are also contemplated. In one embodiment, in which base 24 is formed by injection molding, account identifier 20, redemption indicia 50 and any other indicia or information are printed onto outside surface 40 of the injection molded base 24.

In one example, base 24 and cover 26 are each formed of materials having a similar or identical color. In other examples, base 24 and cover 26 may be formed of materials having different coloring. For instance, in one embodiment, base 24 is colored white to best display the printed account identifier 20, redemption indicia 50, etc. on its outside surface 40 while cover 26 is a different color to correspond with and/or complement the coloring of face panel 132.

Referring once again to FIG. 1, face panel 132 is optionally coupled to housing 12, for example to outside surface 80 within panel indentation 130. In one embodiment, face panel 132 is generally planar and is formed of paper, plastic or other suitable material. In one embodiment, face panel 132 is sized to fit within panel indentation 130 of cover 26. With this in mind, face panel 132 includes a first, outer surface 134 and a second, inner surface 136. First, outer surface 134 includes indicia such as decorative indicia 138, brand indicia 140 and button indicators 142. Second, inner surface 136 of face panel 132 is configured to interface with cover 26 within panel indentation 130. In one embodiment, face panel 132 is adhered to cover 26 with any suitable adhesive. In other embodiments, face panel 132 is formed on an adhesive backed plastic, paper, cardstock, etc. and is directly applied and adhered to cover 26.

In one embodiment, decorative indicia 138 relate to a particular occasion, such as a wedding, new baby, graduation, holiday, season, brand identifier, media format identifier or other visual design to promote purchase of transaction card 10. In one particular embodiment, decorative indicia 138 include a picture or a graphic representing a fictional and/or non-fictional character singing karaoke or in another amusing pose relating to the audio function of transaction card 10 (e.g., relative to at least one of the recordable function and the transformative function of transaction card 10). Brand indicia 140 identify a brand associated with transaction card 10 such as identifying a product brand, a store brand, department, etc.

Button indicators 142 are each positioned on face panel 132 to generally align with one of buttons 16 upon assembly of transaction card 10. In this respect, each button indicator 142 corresponds with a location of transaction card 10 where the bearer, e.g. customer or recipient, can push transaction card 10 to hear the stored audio file, as will be further described below. In one example, face panel 132 covers buttons 16 upon assembly of transaction card 10 and button indicators 142 not only indicate where a bearer of transaction card 10 should press to interact with the corresponding buttons 16, but may also indicate the function of each button such as "play," "record," "transform" or something similar thereto as will be apparent to those of skill in the art upon reading this application. In one embodiment, button indicators 142 may include stylized text or other markings to coordinate with decorative indicia 138, etc. of transaction card 10 as generally illustrated, for example, in FIGS. 1-3.

Button indicator 142 is one example of means for informing a user of how to initiate recording, playing and/or transforming of the audio file stored to transaction card 10, as will be further described below. Other combinations or selections of indicia to be displayed on face panel 132 are also contemplated. In an alternate embodiment, indicia described to be included on face panel 132 are directly printed to outside surface 80 of cover 26. In one embodiment, first, outer surface 134 of face panel 132 is printed and finished in any one of a variety of manners such as dull, matte, gloss, textured or other effect finish.

In addition, in one embodiment, face panel 132 includes a plurality of apertures 144 extending through face panel 132 and configured to generally align with at least a portion of the plurality of speaker apertures 112 and the at least one microphone aperture 126 of cover 26. In this respect, sound coming from speaker 110 has a clear pathway through the plurality of speaker apertures 112 of cover 26 and at least a portion of the plurality of apertures 144 of face panel 132. Similarly, sound from the card bearer has a clear pathway through at least a portion of the plurality of apertures 144 of face panel 132 and microphone aperture 126 to microphone 124. Other combinations or selections of information or indicia to be displayed on face panel 132 are also contemplated.

Figure 8:
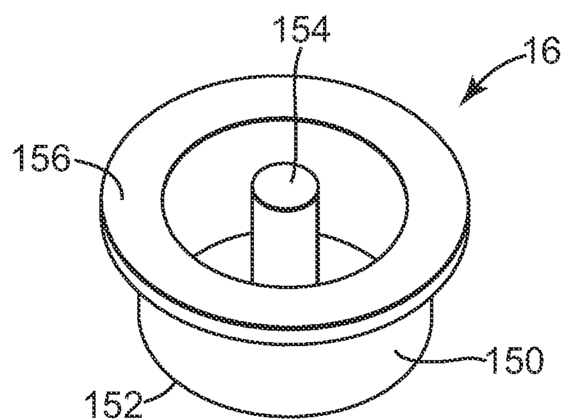
FIG. 8 is a bottom, perspective view of a button of a stored-value card, according to one embodiment of the present invention.

FIG. 8 illustrates a perspective view of one embodiment of one of buttons 16 of transaction card 10. In one example, button 16 generally includes a relatively short hollow cylinder 150, an end wall 152 and a pin 154. End wall 152 extends across one end of hollow cylinder 150. Pin 154 extends from end wall 152 through the center of cylinder 150. In one embodiment, pin 154 extends from end wall 152 a distance further than cylinder 150 extends from end wall 152. Pin 154 is relatively rigid. A ring or rim 156 extends about the perimeter of cylinder 150 on an end opposite end wall 152. More particularly, rim 156 extends radially outwardly from cylinder 150 and, therefore, has a larger diameter than cylinder 150. Cylinder 150 is sized with a diameter sufficient to fit within button aperture 102. Conversely, rim 156 has a diameter greater than the overall diameter of button aperture 102 and raised rim 104 of cover 26.

Figure 9:
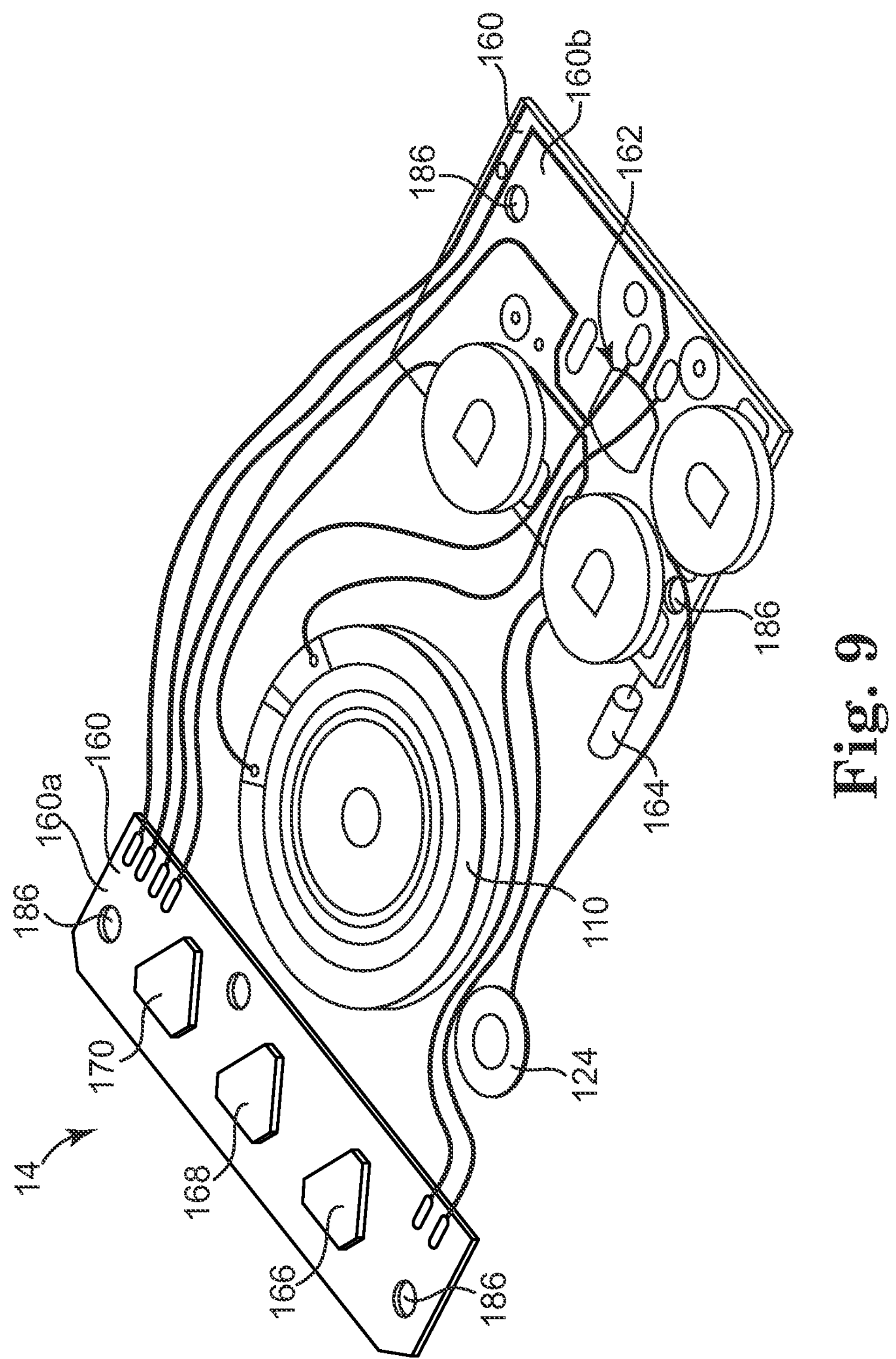
FIG. 9 is a perspective view of an audio circuit of a stored-value card, according to one embodiment of the present invention.

FIG. 9 illustrates one embodiment of audio circuit 14. Audio circuit 14 includes one or more printed circuit boards (PCBs) 160, a voice integrated circuit or chip 162, speaker 110, microphone 124, at least one battery 164, a record switch 166, a play switch 168 and a transformative switch 170 as also illustrated with additional reference to the block diagram of FIG. 10. Voice integrated circuit 162, the at least one battery 164 and switches 166, 168 and 170 are each mounted to the one or more PCBs 160 and are each electrically coupled to each other with wiring or in any other suitable manner. In one embodiment, the one or more PCBs 160 include electrical traces, one or more resistors, one or more capacitors and/or any suitable number of other electrical components facilitating the proper function of audio circuit 14 and/or electrical connection of electrical components mounted on the one or more PCBs 160. In one embodiment, switches 166, 168 and 170 are mounted on a first PCB **160*a* and voice integrated circuit 162 is mounted on a second PCB 160*b* wherein electrical wires connect the first PCB 160*a* with the second PCB 160*b***.

Figure 10:
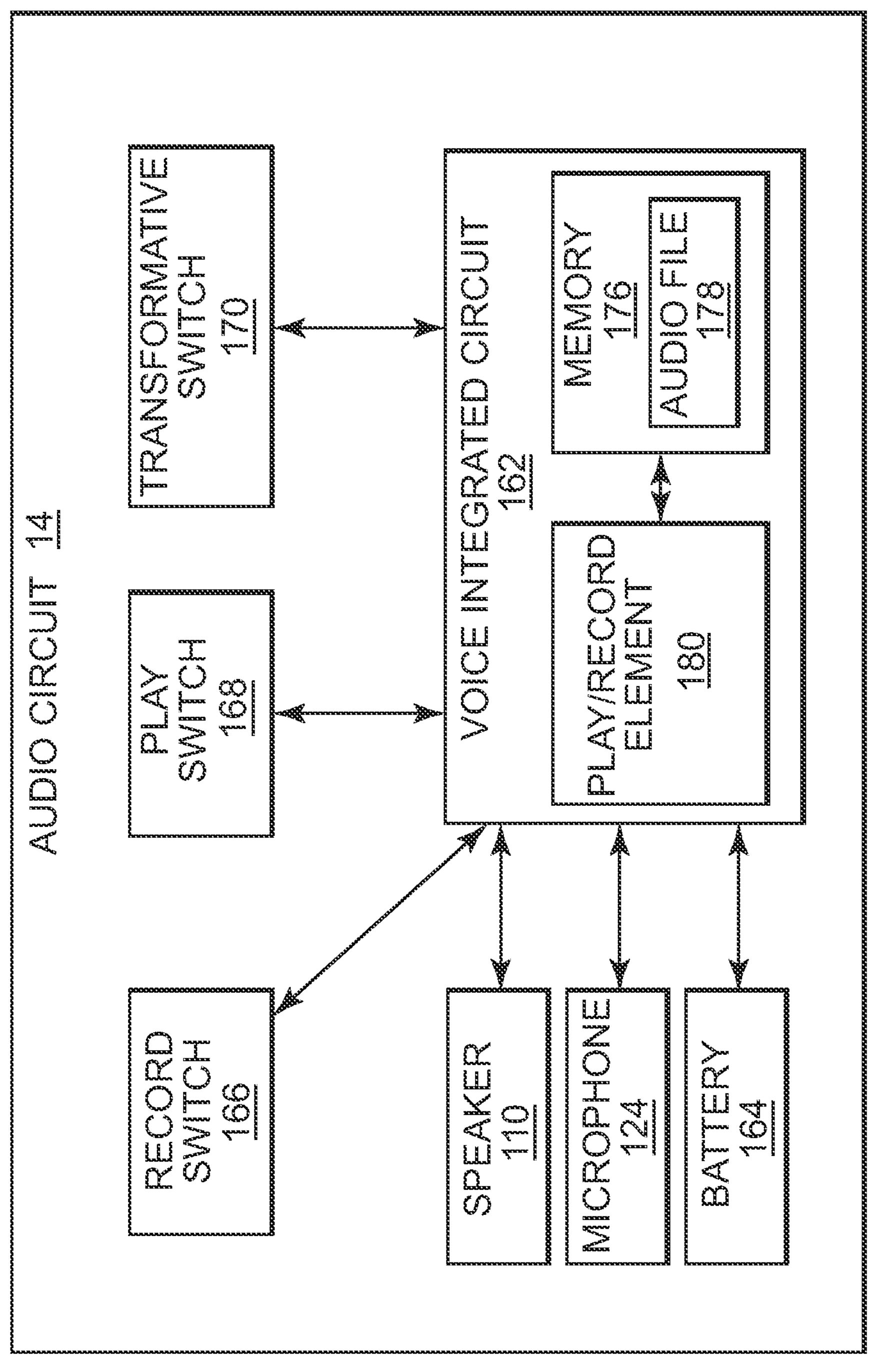
FIG. 10 is a block diagram of one embodiment of the audio circuit of FIG. 9.

In one embodiment, voice integrated circuit 162 includes any suitable memory 176 (FIG. 10). Voice integrated circuit 162 is programmed during manufacturing to store a digitized sound recording or audio file 178 to memory 176. In one embodiment, voice integrated circuit 162 includes a play/record element 180 configured to generate or produce audio file 178 stored by voice integrated circuit 162. Although audio file 178 may initially be empty or may initially be an audio file added to transaction card 10 during manufacturing, in one embodiment, play/record element 180 is additionally configured to record personalized messages for subsequent replay to the bearer of transaction card 10 as will be apparent to those of skill in the art upon reading this application. In one embodiment, play/record element 180 is electrically coupled with speaker 110 and microphone 124.

Speaker 110 is any suitable speaker capable of converting audio file 178 received from voice integrated circuit 162 into sound waves perceivable by the bearer of transaction card 10, e.g., the customer and/or recipient. In one example, speaker 110 is a 27 mm speaker or any other suitably sized speaker 110. Audio circuit 14 with speaker 110 is one example of means for generating sound within transaction card 10. In one embodiment, microphone 124 is any suitable electroacoustic transducer configured to capture environmental sound waves and to convert such sound waves into an equivalent electrical signal adapted to be stored in memory 176 as audio file 178 and sized to at least partially fit within housing 12.

Each switch 166, 168 and 170 is configured to actuate voice integrated circuit to perform a particular function. In one embodiment, each switch 166, 168 and 170 is a snap or pressure sensitive switch mounted to the one or more PCBs 160, for example, to first PCB **160*a*. Activation of each switch 166, 168 and 170 serves to close a connection within audio circuit 14 and to activate voice integrated circuit 162 to perform a task or function corresponding with the activated switch 166, 168 or 170. For example, upon activation of record switch 166, voice integrated circuit 162 is notified and microphone 124 is readied to capture a sound wave from the bearer of transaction card 10 (e.g., a personalized audio message spoken or played generally toward transaction card 10) or other environmental sound wave and to convert such sound waves into audio file 178, which is stored to memory 176 of integrated circuit 162. Upon activation of play switch 168, voice integrated circuit 162 accesses audio file 178 stored in memory 176 and plays audio file 178 as sound waves via speaker 110**.

In one embodiment, upon activation of transformative switch 170, voice integrated circuit 162 is configured to alter or transform the audio properties of audio file 178 being played. For example, activation of transformative switch 170 while audio file 178 is playing may cause audio file 178 to be played at a different speed, with a different frequency (i.e., at a different pitch), in a different tone, with a different period, with different reverberation, with different vibrato or with any other different audio property than was originally associated with audio file 178 when audio file 178 was initially recorded to memory 176. For example, upon activation of transformative switch 170, audio file 178 may be played at a faster speed, which, in one embodiment, results in an amusing playback of audio file 178.

Of note, for purposes of this application, the audio properties referred to above (e.g., speed, frequency, period, reverberation, and vibrato) do not include altering the amplitude or volume of audio file 178 alone. Rather, altering the audio properties as described herein includes a transformation of the sound as an alternative to or in addition to transforming the amplitude (i.e., volume due to the maximum amount of displacement along a corresponding sound wave) of audio file 178 such that audio file 178 not only sounds louder or softer than the initially recorded audio file 178, but audio file 178 is actually transformed or synthesized such that when played, audio file 178 is audibly different than the initially recorded audio file 178 (e.g., in one of pitch, period, speed, reverberation, and vibrato). In this manner, the played and transformed audio file 178 will sound different than the voice of the individual who originally recorded audio file 178.

In one embodiment, reverberation of audio file 178 is transformed during playback such that the voice of the bearer of transaction card 10 plays back in a manner imitating a computerized or robotic voice. Other audio effects/properties may be used and/or adjusted to alter the recorded voice of the bearer of transaction card 10 to playback in a manner imitating a well-known voice or to achieve any other desired transformative effect as will be apparent to those of skill in the art upon reading the present application. In addition, although primarily disclosed herein as transforming audio file 178 during playback, it should be understood, that in one embodiment, the captured audio file 178 may have one or more properties transformed prior to storing audio file 178 in memory 176 (e.g., while audio file 178 is recorded), such that playback of audio file 178 as stored in memory 176 differs from how audio file 178 was originally recorded. Other suitable arrangements of audio circuit 14 and timings regarding transformation of recorded audio file 178 will be apparent to those of skill in the art upon reading the present application.

Other specifics regarding the transformative capabilities and structure of voice integrated circuit 162 will be apparent to those of skill in the art upon reading the present application as dictated by the effect/property that one desires to alter upon activation of transformative switch 170. In addition, although primarily described above as effectuating a single transformative effect/property upon activation of single transformative switch 170, in one embodiment, a single switch 170 may be used to effectuate any one or more of a plurality of transformative effects/properties and/or more than one transformative switch 170 may be included where each switch 170 relates to a different transformative effect/property.

Battery 164 provides electrical power to the one or more PCB 160 and voice integrated circuit 162. In one embodiment, battery 164 is an alkaline battery such as a standard AG10 1.5 volt battery or any other suitable battery.

As illustrated with reference to FIGS. 1, 7, 8 and 9, during assembly, each button 16 is placed within a corresponding button aperture 102 such that cylinder 150 of each button 16 fits within rim 104 of the corresponding button aperture 102, and rim 156 of button 16 interfaces with and extends over rim 104 of button aperture 102, thereby coupling button 16 to cover 26. In this respect, rim 156 of button 16 prevents button 16 from falling through button aperture 102 toward the outside of cover 26 (e.g., from inside surface 82 through primary panel 70 past outside surface 80).

Once buttons 16 are each positioned within their respective button aperture 102, audio circuit 14 is coupled to cover 26. In particular, in one embodiment each of the one or more PCBs 160 of audio circuit 14 includes features such as apertures 186 sized and positioned to each receive one of protrusions 100 of cover 26. Each of the one or more PCBs 160 may additionally or alternatively be adhered or otherwise coupled to cover 26. More specifically, in one embodiment, first PCB **160*a* is positioned relative to cover 26 to align each of switches 166, 168 and 170 mounted thereon with one of buttons 16, and therefore, with button apertures 102 such that activation of one of buttons 16 (i.e., movement of one of buttons 16 further into housing 12) causes the respective button 16 to interact with the corresponding switch 166, 168 or 170 of audio circuit 14 and thereby effectuates activation of voice integrated circuit 162 to perform a desired function (e.g., record, play and/or transform audio file 178**.

Speaker 110 is positioned within speaker reception area 106 of cover 26. In particular, speaker 110 is fit within rim 108 such that a front of speaker 110 is placed adjacent inside surface 82 of primary panel 70 of cover 26. As such, speaker 110 is also aligned with and positioned adjacent to the plurality of speaker apertures 112. Speaker 110 may additionally be adhered or otherwise coupled with cover 26 (e.g., with inside surface 82 and/or rim 108) and/or base 24.

In one embodiment, microphone 124 is positioned within microphone reception area 120 of cover 26. In particular, microphone 124 is fit within rim 122 such that the front of microphone 124 is placed adjacent inside surface 82 of primary panel 70 of cover 26. As such, microphone 124 is also aligned with and positioned adjacent to the at least one microphone aperture 126. Microphone 124 may additionally be adhered or otherwise coupled with cover 26 (e.g., with inside surface 82 and/or rim 122) and/or base 24. In other embodiments, audio circuit 14 is at least partially posited with respect to and/or coupled to base 24 rather than or in addition to cover 26.

Once audio circuit 14 is properly positioned, base 24 is placed upon cover 26 or vice versa. Accordingly, base 24 is placed on cover 26 such that inside edge 44 of base 24 interfaces with inside edge 84 of cover 26. More specifically, first portion 46 and second portion 48 of inside edge 44 interface with first portion 86 and second portion 88 of inside edge 84, respectively. The stepped interface provides for a stable and generally neat coupling of base 24 and cover 26. In one example, adhesive is applied between inside edge 44 and inside edge 84 to secure base 24 to cover 26 and/or cover 26 is ultrasonically welded or otherwise coupled with base 24 along inside edges 44 and 84. In one embodiment, upon coupling of base 24 with cover 26, cylindrical protrusions 54 of base 24 receive some of the plurality of protrusions 100 (FIG. 7) of cover 26. Other methods of securing base 24 to cover 26 are also contemplated.

Following securing of base 24 to cover 26, in one embodiment, second, inner surface 136 of face panel 132 is applied to outside surface 80 of cover 26. In particular, face panel 132 is fit and adhered within panel indentation 130 to generally align apertures 144 with the plurality of speaker apertures 112 and the at least one microphone aperture 126 of cover 26. When aligned and placed on cover 26, button indicators 142 of face panel 132 each generally align with a corresponding button 16. In one embodiment, face panel 132 is also adhered to end wall 152 of each button 16. In other embodiments, face panel 132 is applied to cover 26 before assembling cover 26 with button 16, audio circuit 14 and/or base 24.

Upon assembly, transaction card 10 functions to both amuse consumers and/or recipients and to entice consumers to purchase transaction card 10. In particular, upon a consumer or recipient pressing face panel 132 in a position corresponding with one of button indicators 142, the corresponding button 16 is activated thereby also activating one of switches 166, 168 or 170 of audio circuit 14. Activation (e.g., pressing, moving or other suitable interaction) with one of switches 166, 168 or 170 activates the audio circuit 14 to record, play or transform audio file 178, respectively. In particular, additionally referring to FIGS. 9 and 10, activation with record switch 166 closes audio circuit 14, thereby drawing current from the at least one battery 164 to voice integrated circuit 162 and signaling voice integrated circuit 162 to record sound waves via microphone 124 and to save recorded sound waves to memory 176 as audio file 178 once the sound waves have been converted to equivalent electrical signals.

Similarly, activation with play switch 168 closes a different portion of audio circuit 14, thereby drawing current for the at least one battery 164 to voice integrated circuit 162 to play audio file 178 stored to memory 176 via speaker 110. Further, activation with transformative switch 170 closes a different portion of audio circuit 14, thereby drawing current for the at least one battery 164 to voice integrated circuit 162 to transform the playback audio file 178. Although primarily described as transforming audio file 178 when audio file 178 is already being played due to activation of play switch 168, in one embodiment, activating transformative switch 170 alone causes audio file to be both played and transformed, and in one embodiment, play switch 168 is eliminated. In view of the above, different portions of audio circuit 14 provide example means for recording audio file 178, means for playing audio file 178 and means for transforming or altering at least one of the audio properties of audio file 178 as will be apparent to those of skill in the art upon reading the present application.

In one embodiment, when audio file 178 is finished being recorded or played, voice integrated circuit 162 automatically deactivates or shuts off. In one embodiment, the current drawn by voice integrated circuit 162 during its inactive state is sufficiently low to allow the at least one battery 164 to provide power to audio circuit 14 as needed for a number of months or years. User interaction with one of buttons 16 and thereby audio circuit 14 illustrates one example of means for recording, playing and/or transforming the audio file upon user demand. Accordingly, the customer and/or recipient are presented with both a stored-value card and a source of additional audible amusement.

Figure 11:
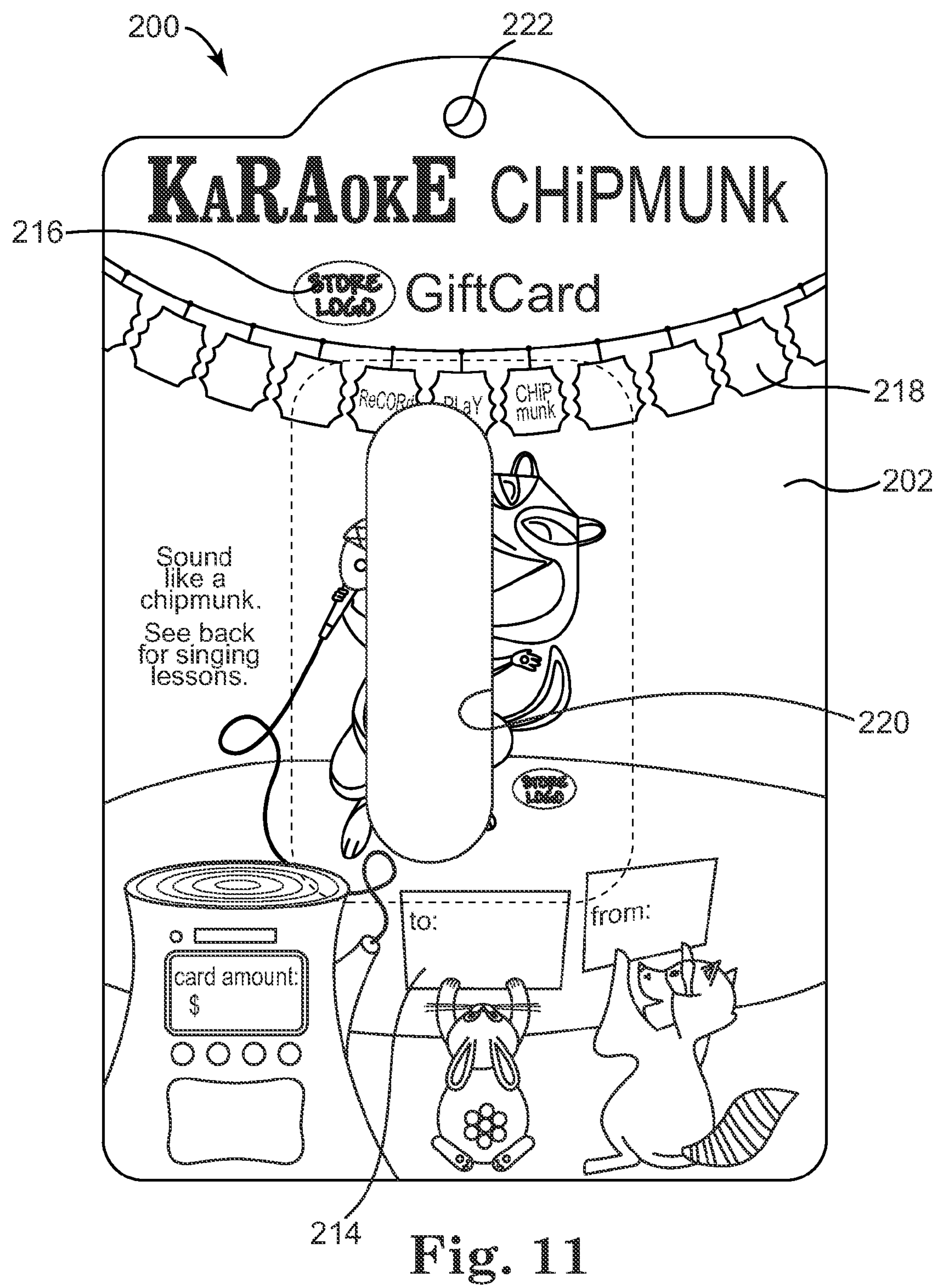
FIG. 11 is a front view of an unfolded carrier for a transaction card, according to one embodiment of the present invention.
Figure 12:
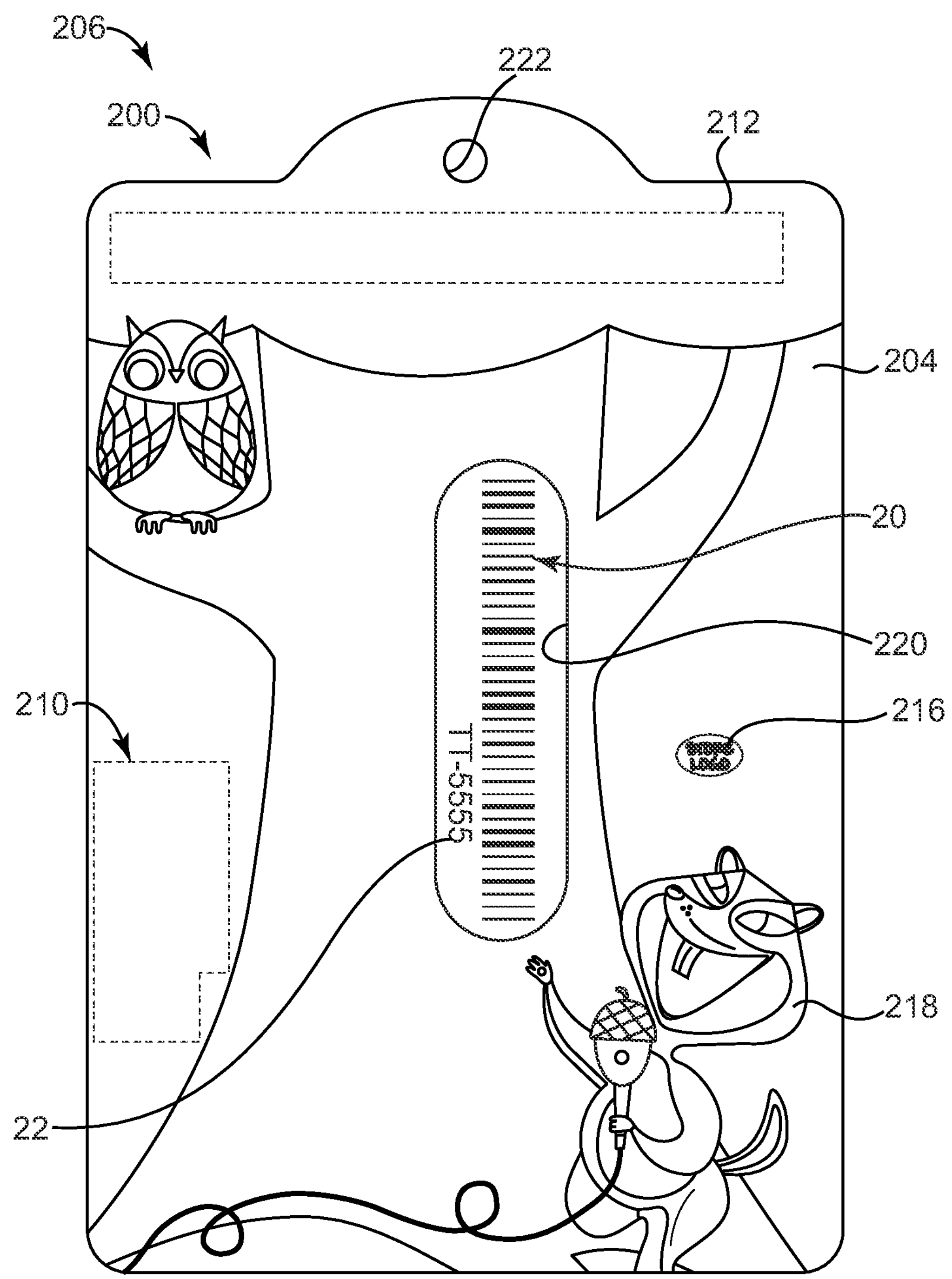
FIG. 12 is a back view of a transaction card assembly including the unfolded carrier of FIG. 11 with the transaction card of FIG. 1.

FIGS. 11 and 12 illustrate a carrier or backer 200 supporting transaction card 10 (FIGS. 1-6). Backer 200 comprises a single layer or multiple layers of paper or plastic material, for example, generally in the form of a relatively stiff but bendable/flexible card. Use of other materials is also contemplated. As such, backer 200 defines a first or front surface 202 (FIG. 11) and a second or rear surface 204 (FIG. 12). Transaction card 10, which is generally represented in phantom lines in FIG. 11 for illustrative purposes (e.g., to allow for full viewing of front surface 202), is readily releasably attached to backer 200, for example, by adhesive, blister packaging, overlying skinning material or the like, such that transaction card 10 with backer 200 collectively define a transaction card assembly 206.

Backer 200 displays indicia, graphics or text information including store logo(s), store name(s), slogans, advertising, instructions, directions, brand indicia, promotional information, holiday indicia, seasonal indicia, media format identifiers, characters and/or other information. The various indicia may be included on one or more of front and rear surfaces 202 and 204. In one example, the indicia include one or more of redemption indicia 210, instructional indicia 212, message field indicia 214, brand indicia 216, decorative indicia 218, etc.

Redemption indicia 210 indicate that transaction card 10 is redeemable for the purchase of goods and/or services and that upon use, a value of the purchased goods and/or services will be deducted from the financial account or record linked to transaction card 10. In one embodiment, redemption indicia 210 include phrases such as "<NAME OF STORE> GiftCard" and "This GiftCard is redeemable for merchandise or services at any of our stores or at our website," and/or provides help or phone line information in case of a lost, stolen or damaged transaction card 10, etc.

Instructional indicia 212 include any indicia generally referring to how transaction card 10 can be used for purposes other than value redemption. For example, indicia 212 may instruct the bearer the activating and holding down the one of button indicators 142 marked "Record" will allow a user to record personalized message (i.e., an audio file 178), activating the one of the button indicators 142 marked "Play" will cause the recorded personalized message to be played back to the bearer and/or that activating the one of the button indicators 142 marked "Transform" or something similar will cause the playback of the personalized message to be transformed in at least one audio property such that the message sound different when played back as compared to when recorded Other instructional indicia 212 are also contemplated.

Message field indicia 214 for example include "to," "from" and "amount" fields are configured to be written to by the bearer of transaction card assembly 206 prior to presenting transaction card assembly 206 to a recipient. As such, message field indicia 214 facilitate the consumer in preparing transaction card assembly 206 for gifting to a recipient.

Brand indicia 216 identify a store, brand, department, etc. and/or services associated with transaction card 10. Any decorative indicia 218, which may be similar to or coordinate with indicia of transaction card 10, may also be included on backer 200. Any of indicia 210, 212, 214, 216, 218 or other indicia optionally may appear anywhere on backer 200 or transaction card 10. In one embodiment, at least one of indicia 210, 212, 214, 216, 218 or other indicia include stylized text further contributing to the aesthetics of transaction card assembly 206 as illustrated, for example, in FIGS. 11 and 12. Additional information besides that specifically described and illustrated herein may also be included.

In one embodiment, backer 200 includes a window or opening 220 for displaying account identifier 20 of transaction card 10 as illustrated in FIG. 12. As previously described, account identifier 20 is adapted for accessing an account or record associated with transaction card 10 for activating, loading or debiting value from the account or record. Accordingly, in one embodiment, opening 220 allows access to account identifier 20 to activate and/or load transaction card 10 without removing transaction card 10 from backer 200.

In one embodiment, backer 200 defines a hanging aperture 222 configured to receive a support arm or hook, such that transaction card assembly 206 can be hung from a rail or rack within the retail setting or elsewhere to facilitate display of transaction card assembly 206. According to one embodiment, FIG. 12 illustrates surfaces of backer 200 that will be supported on a rack or other fixture while FIG. 11 illustrates surfaces of backer 200 that will be visible to a consumer of a retail store who is considering the purchase of transaction card assembly 206. Other backers, such as foldable backers (not shown), can be used with various sizes and shapes of transaction cards 10.

Figure 13:
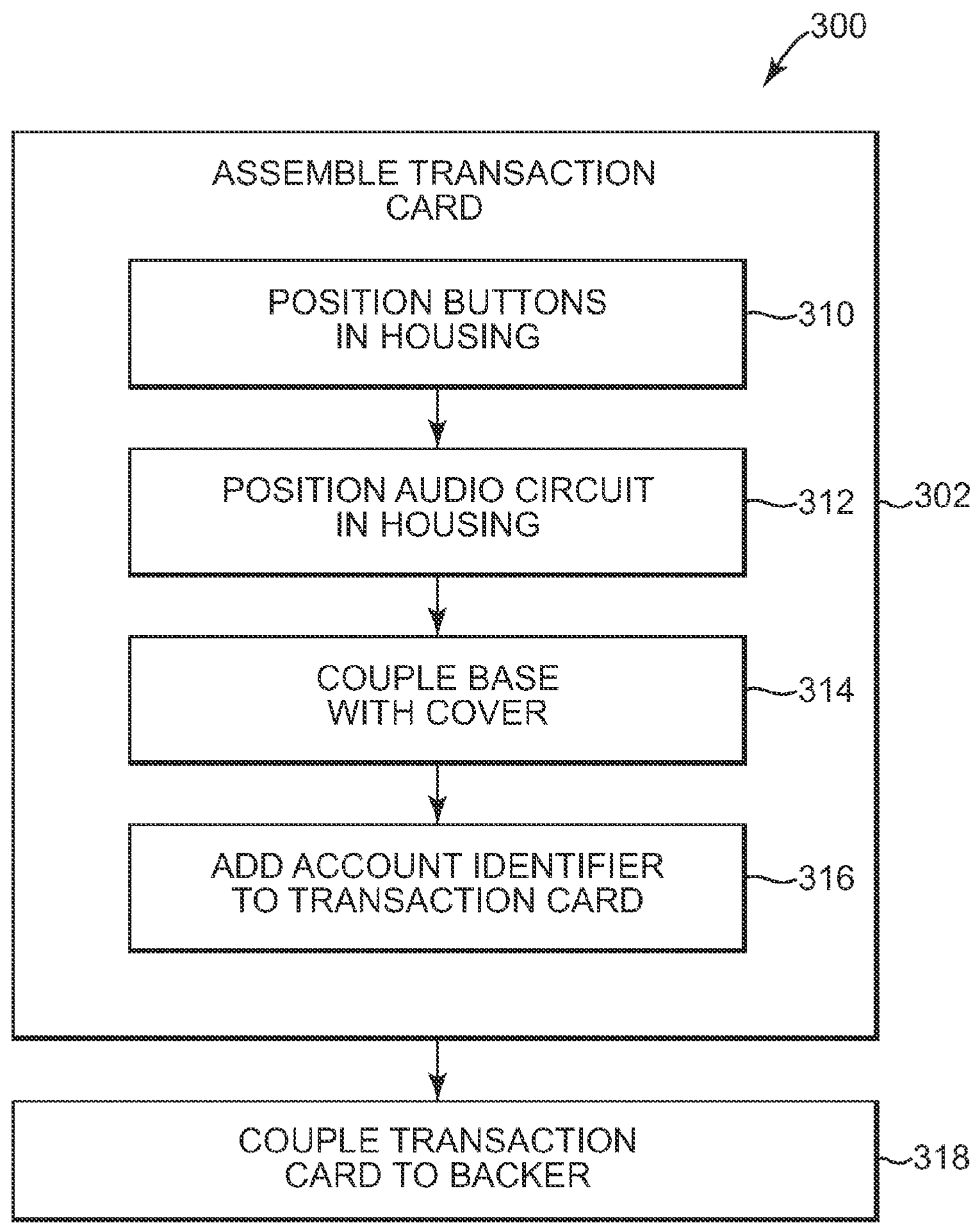
FIG. 13 is a flow chart illustrating a method of assembling the transaction card of FIG. 1, according to one embodiment of the invention.

FIG. 13 is a flow chart illustrating one embodiment of a method 300 of assembling transaction card 10. For example, at 310 buttons 16 are placed relative to housing 12 for example to at least partially be seated within button apertures 102 of cover 26. At 312, audio circuit 14 is positioned in housing 12, for instance, is coupled with cover 26 such that switches 166, 168 and 170 each align with one of buttons 16 such that subsequent activation of one of buttons will cause activation of the corresponding one of switches 166, 168 and 170. Once buttons 16 and audio circuit 14 are in place, base 24 and cover 26 are coupled to one another. In one instance, inside edge 44 of base 24 is positioned to abut and be secured to inside edge 84 of cover 26 as described above. Other methods of coupling base 24 and cover 26 are also contemplated as are alternative housings 12 that may not include base 24 and/or cover 26.

At 316, account identifier 20 is added to housing 12. Although pictured in FIG. 13 as occurring after all of operations 310, 312 and 314 in FIG. 13, it should be understood that account identifier 20 may be applied to housing 12 or any portion thereof at any suitable time during manufacturing and assembly thereof. For example, account identifier 20 may be molded into or otherwise integrally formed as part of housing 12, may be enclosed within housing 12 and/or may be printed or otherwise applied to housing 12 before or after one or more of operations 310, 312 and 314 as will be apparent to those of skill in the art upon reading this application.

At 318, transaction card 10 is coupled with backer 200 as generally illustrated with additional reference to FIGS. 11 and 12 to form transaction card assembly 206. Transaction card 10 may be adhered, skinned to, blister packed with or otherwise suitable coupled with backer 200. In one embodiment, account identifier 20 of transaction card 10 is accessible for scanning while transaction card 10 is coupled with backer 200.

Figure 14:
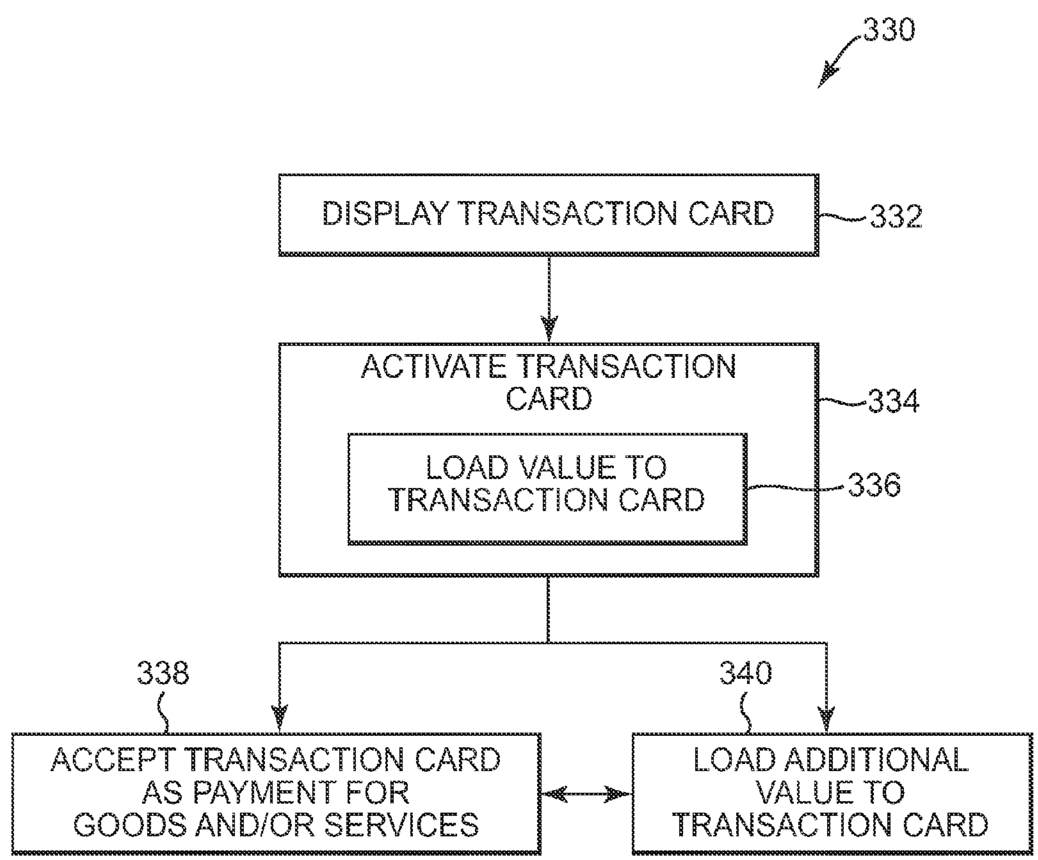
FIG. 14 is a flow chart illustrating a method of encouraging purchase and facilitating use of a transaction card, according to one embodiment the present invention.

FIG. 14 is a flow chart illustrating one embodiment of a method 330 of encouraging purchase and facilitating use of transaction card 10 by consumers and/or recipients. At 332, transaction card 10 is placed on or hung from a rack, shelf or other similar device to display transaction card 10 for sale to potential consumers. For example, additionally referring to FIGS. 11 and 12, backer 200 may be hung from a display rack using aperture 222 such that transaction card 10 is readily visible to potential consumers. In one embodiment, a depiction of transaction card 10 is placed on a web site for viewing and purchase by potential consumers. In one example, display of transaction card 10 includes advertising the record and playback features (i.e., the ability of transaction card 10 to record, play and/or transform an audio file) of the transaction card 10 to encourage consumer purchase of transaction card 10, for example in the forms of indicia 210, 212, 218, etc.

At 334, a consumer who has decided to purchase transaction card 10 presents transaction card 10 on backer 200 to a retail store employee, retail store kiosk, remote terminal or other person or device to scan account identifier 20 to access an account or record linked to account identifier 20. In particular, account identifier 20 is scanned or otherwise accessed, for example through opening 220 of backer 200 to activate transaction card 10. Upon accessing the account or record, then, at 336, value is added to the account or record in the form of monetary value, points, minutes, etc. Thus, transaction card 10 is activated and loaded.

In one example, a predetermined value is associated with transaction card 10 (i.e., associated with the account or record linked to transaction card 10 via account identifier 20) prior to activation and display, but such predetermined value is not initially available for use toward the purchase or use of goods and/or services. In such an embodiment, at 334, transaction card 10 is activated to permit subsequent access to the predetermined value (e.g., subsequent loading on and debiting from the account or record) and no additional value is added during activation such that operation 336 may be eliminated.

Once transaction card 10 is activated and loaded, transaction card 10 can be used by the consumer or any other bearer of transaction card 10 to purchase goods and/or services at the affiliated retail setting (e.g., a retail store or web site) or can be used in exchange for calling minutes, etc. In one embodiment, where transaction card 10 is displayed on a web site at 332, then, at 334, transaction card 10 may be activated in any suitable method and may not require the physical scanning of account identifier 20 to be activated or to otherwise access the associated account or record such as at 336.

In one example, at 338, the retail store or other affiliated retail setting or web site accepts transaction card 10 as payment towards the purchase of goods and/or services made by the current bearer of transaction card 10. In particular, the value currently loaded on transaction card 10 (i.e., stored or recorded in the account or record linked to account identifier 20) is applied toward the purchase of goods and/or services. At 340, additional value is optionally loaded on transaction card 10 at a point-of-sale terminal, kiosk or other area of the retail store, retail web site, or other related setting. Upon accepting transaction card 10 as payment at 338, the retail store or related setting can subsequently perform either operation 338 again or operation 340 as requested by a current bearer of transaction card 10. Similarly, upon loading additional value on transaction card 10 at 340, the retail store or related setting can subsequently perform either operation 340 again or operation 338. In one example, the ability to accept transaction card 10 as payments for goods and/or services is limited by whether the account or record associated with transaction card 10 has any value stored or recorded therein at the time of attempted redemption.

Figure 15:
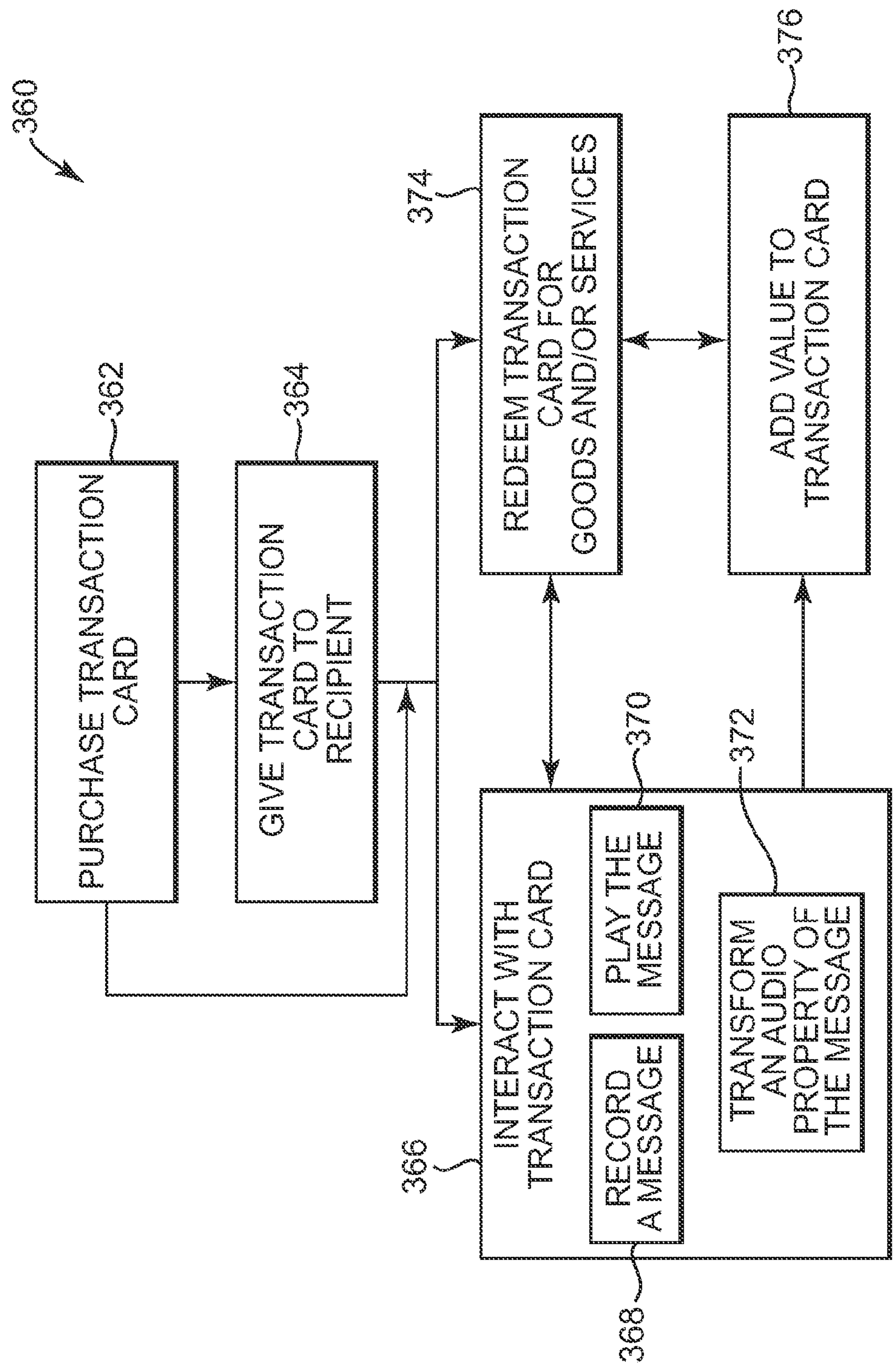
FIG. 15 is a flow chart illustrating a method of using a transaction card, according to one embodiment of the present invention.

FIG. 15 is a flow chart illustrating one embodiment of a method 360 of using transaction card 10 (e.g., FIGS. 1-6). At 362, a potential consumer of transaction card 10, which is displayed in a retail store or viewed on a web site, decides to and does purchase transaction card 10 from the retail store or web site. It should be understood that transaction card 10 can be displayed and purchased alone or as part of transaction product assembly 206 (FIG. 12) along with backer 200. Upon purchasing transaction card 10, a retail store employee, a retail store kiosk or other person or device scans account identifier 20 (FIGS. 4 and 12) through opening 220 of backer 200 or otherwise reads or accesses account identifier 20. Upon accessing account identifier 20, the account or record linked to account identifier 20 is accessed and activated to load value onto transaction card 10 (i.e., load value to the account or record associated with transaction card 10). In one embodiment, such as where transaction card 10 is purchased at 362 via a web site, actual scanning or other mechanical detection of account identifier 20 may be eliminated and/or manual input of code 22 may be added.

At 364, the consumer optionally gives transaction card 10 to a recipient, such as a graduate, relative, friend, expectant parents, one having a recent or impending birthday, a couple having a recent or impending anniversary, etc. In one embodiment, a plurality of transaction cards 10 are purchased and given to party goers, such as at a birthday party, etc. as party favors or gifts. As an alternative, the consumer can keep transaction card 10 for his or her own use thereby eliminating operation 364.

At 366, the consumer, recipient or other current bearer of transaction card 10 interacts with transaction card 10. In one embodiment, playing or otherwise interacting with transaction card 10 at 366 includes one or more of recording a message (i.e., an audio file 178) at 368, playing the message at 370 and transforming the audio properties of the message being played at 372. For example, in one embodiment, interacting with transaction card 10 includes first recording the message at 368, then playing the message at 370 and transforming the audio properties of the message at 372 while the message is being played at 370. In one embodiment where audio file 178 is already stored by audio circuit 14, operation 368 may be eliminated. In one example, operation 368 can be repeated by the bearer of transaction card 10 as desired. In one embodiment, repeated performance of operation 368 writes each newly recorded message over any prior audio file 178 stored by audio circuit 14.

At 374, the consumer or recipient redeems transaction card 10 for goods and/or services from the retail store or web site. At 376, the consumer or recipient of transaction card 10 optionally adds value to transaction card 10, more particularly, to the account or record associated with account identifier 20 included therewith, at the retail store or over the Internet (i.e., via the web site). Upon playing with transaction card 10 at 366, redeeming transaction card 10 at 374 or adding value to transaction card 10 at 376, the consumer or recipient of transaction card 10 subsequently can perform either of operations 366, 374 or 376 as desired. In one embodiment, the ability of the consumer or recipient to repeat redeeming transaction card 10 at 374 is limited by whether the account or record linked with transaction card 10 has any remaining value stored or recorded therein at the time of attempted redemption.

Although primarily described above as occurring at a single retail store or web site, in one embodiment, purchasing transaction card 10 at 362, redeeming transaction card 10 at 374 and adding value to transaction card 10 at 376, can each be performed at any one of a number of stores adapted to accept transaction card 10 or over the Internet. In one example, a number of stores are each part of a chain or are similarly branded stores. In one example, a number of stores include at least one web site and/or at least one conventional brick and mortar store.

Transaction cards come in many forms, according to embodiments of the invention. The gift card, like other transaction cards, can be "re-charged" or "re-loaded" at the direction of the original consumer, the gift recipient or a third party. The term "loading on" or "loaded on" herein should be interpreted to include adding to the balance of an account or record associated with a transaction card. The balance associated with the transaction card declines as the transaction card is used, encouraging repeat visits or use. The transaction card remains in the user's purse or wallet, serving as an advertisement or a reminder to revisit the associated merchant. Gift cards according to embodiments of the invention provide a number of advantages to both the consumer and the merchant. Other gift cards and transaction cards according to embodiments of the invention include loyalty cards, merchandise return cards, electronic gift certificates, calling cards, employee cards, frequency cards, prepaid cards and other types of cards associated with or representing purchasing power, monetary value, etc.

Although the invention has been described with respect to particular embodiments, such embodiments are for illustrative purposes only and should not be considered to limit the invention. Various alternatives and other modifications within the scope of the invention in its various embodiments will be apparent to those of ordinary skill.

What is claimed is:

1. A transaction card, comprising:

an audio circuit configured to capture an audio file and to transform a pitch of the audio file, the audio circuit including a speaker, wherein the speaker is coupled to a remainder of the audio circuit and configured to play the captured audio file as transformed by the audio circuit with a different pitch than the pitch originally captured for the audio file;

a housing substantially enclosing the audio circuit;

a switch movable by a bearer of the transaction card external to the housing, wherein when the bearer interacts with the switch, the audio circuit is activated to transform the pitch of the audio file to the different pitch; and an account identifier fixedly coupled to the housing, the account identifier linking the transaction card to an account or record, wherein the account identifier is machine readable.

2. The transaction card of claim 1, wherein the account identifier is a bar code.

3. The transaction card of claim 1, wherein the account identifier includes at least one of a bar code, a magnetic strip, a smart chip and a radio frequency identification (RFID) device.

4. The transaction card of claim 1, wherein:

the audio circuit is configured to transform at least one additional audio property of the audio file, and the at least one additional audio property includes one or more of speed, tone, period, reverberation, and vibrato of the audio file.

5. The transaction card of claim 1, wherein the audio circuit is configured to transform the pitch of the audio file during playback of the audio file by the audio circuit.

6. The transaction card of claim 5, wherein:

the audio circuit includes a memory, and the memory stores at least one of the audio file as initially captured with the pitch originally captured for the audio file and the audio file after transformation with the different pitch.

7. The transaction card of claim 1, wherein:

the audio circuit includes a memory, the memory stores the audio file as originally captured, and bearer interaction with the switch also activates the audio circuit to play the audio file stored to the memory with the different pitch.

8. The transaction card of claim 1, wherein:

the audio circuit includes a memory, the memory stores the audio file with the pitch as originally captured, the transaction card further comprises a play button separate from the switch, and bearer interaction with the play button activates the audio circuit to play the audio file stored to the memory.

9. The transaction card of claim 1, further comprising a record button, wherein bearer interaction with the record button activates the audio circuit to capture the audio file.

10. The transaction card of claim 9, wherein:

the audio circuit includes a memory, and bearer interaction with the record button activates the audio circuit to capture the audio file and to record the audio file to the memory.

11. The transaction card of claim 10, wherein:

the audio circuit includes a microphone configured to capture sound waves, and the audio circuit is configured to save an electronic equivalent of the sound waves to the memory as the audio file upon bearer interaction with the record button.

12. The transaction card of claim 10, wherein:

the audio file is a second audio file, the memory is initially recorded with first audio file, and the audio circuit is configured to capture the second audio file and to replace the first audio file stored in the memory with the second audio file.

13. The transaction card of claim 1, in combination with a carrier releasably coupled to the housing of the transaction card, wherein the carrier is configured to instruct the bearer of the transaction card how to use the transaction card to capture and transform the pitch of the audio file such that upon playback of the audio file, the audio file sounds different than when the audio file was initially captured.

14. A stored-value product comprising:

means for linking the stored-value product with at least one of an account and a record having a value associated therewith such that the stored-value product can be used as payment toward a purchase of one or more of goods and services;

means for capturing a sound file with an captured pitch;

means for altering at least the captured pitch of the sound file to an altered pitch such that when the sound file is played;

means for playing the sound file with the altered pitch such that the sound file audibly differs in pitch from the sound file as originally captured; and means for substantially enclosing the means for capturing, the means for altering and the means for playing.

15. The stored-value product of claim 14, wherein the means for altering the original pitch includes means for altering at least one or more of speed, tone, period, reverberation, and vibrato of the sound file.

16. The stored-value product of claim 14, wherein the means for altering the captured pitch of the sound file is configured to alter the captured pitch to provide the altered pitch while the sound file is played by the means for playing.

17. The stored-value product of claim 14, further comprising means for storing the sound file to the stored-value product, wherein the sound file is stored with the captured pitch.

18. The stored-value product of claim 14, further comprising means for storing the sound file captured by the means for capturing, wherein the means for altering the captured pitch of the sound file to the altered pitch is configured to alter the captured pitch while the sound file is recorded.

19. The stored-value product of claim 14, further comprising means for storing the sound file, wherein:

the sound file is a first sound file, and the means for storing is configured to store a second sound file over the first sound file when the means for capturing is repeatedly utilized.

20. A method of encouraging purchase and facilitating use of a stored-value card linked to a record or account, the method comprising:

providing a stored-value card, wherein:

the stored-value card includes record and playback features such that the stored-value card is configured to record an audio file and to playback the audio file with at least a pitch property that differs from at least one originally recorded pitch property of the audio file, and displaying the stored-value card to a potential consumer in a retail setting, wherein displaying the stored-value card includes:

advertising the record and playback features of the stored-value card to the potential consumer, and allowing the potential consumer to playback the audio file with the at least the pitch property differing from the at least one originally recorded pitch property of the audio file to encourage purchase of the stored-value card; and activating the record or account linked to the stored-value card to permit subsequent deductions from a value associated with the record or the account for application toward one of a purchase and a use of one or more of goods and services.

21. The method of claim 20, wherein providing the stored-value card includes providing the stored-value card configured to playback the audio file with differing reverberation than was present for the audio file when the audio file was recorded to the stored-value card.

* * * * *